(12) United States Patent
Warashina et al.

(10) Patent No.: US 11,139,592 B2
(45) Date of Patent: Oct. 5, 2021

(54) TERMINAL CONNECTING METHOD

(71) Applicant: YAZAKI CORPORATION, Tokyo (JP)

(72) Inventors: Shinya Warashina, Makinohara (JP); Tomohiro Kako, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 337 days.

(21) Appl. No.: 16/185,165

(22) Filed: Nov. 9, 2018

(65) Prior Publication Data
US 2019/0165493 A1    May 30, 2019

(30) Foreign Application Priority Data
Nov. 24, 2017   (JP) .............................. JP2017-226072

(51) Int. Cl.
| | |
|---|---|
| *H01R 4/18* | (2006.01) |
| *B23K 20/12* | (2006.01) |
| *H01R 43/02* | (2006.01) |
| *B23K 20/233* | (2006.01) |
| *H01R 43/048* | (2006.01) |
| *B23K 103/10* | (2006.01) |
| *B23K 101/32* | (2006.01) |
| *B23K 101/38* | (2006.01) |
| *B23K 103/12* | (2006.01) |
| *B23K 103/18* | (2006.01) |

(52) U.S. Cl.
CPC .......... *H01R 4/187* (2013.01); *B23K 20/127* (2013.01); *B23K 20/129* (2013.01); *B23K 20/2333* (2013.01); *B23K 20/2336* (2013.01); *H01R 4/185* (2013.01); *H01R 43/0207* (2013.01); *H01R 43/0249* (2013.01); *B23K 2101/32* (2018.08); *B23K 2101/38* (2018.08); *B23K 2103/10* (2018.08); *B23K 2103/12* (2018.08); *B23K 2103/18* (2018.08); *H01R 43/0484* (2013.01)

(58) Field of Classification Search
None
See application file for complete search history.

(56) References Cited

U.S. PATENT DOCUMENTS

| | | | | |
|---|---|---|---|---|
| 7,705,265 B2 * | 4/2010 | Asakura | ............ | H01R 43/0221 219/121.64 |
| 7,867,014 B2 * | 1/2011 | Kuwayama | ............ | H01R 4/185 439/452 |

(Continued)

FOREIGN PATENT DOCUMENTS

| | | | |
|---|---|---|---|
| JP | 2004311061 A | * | 11/2004 |
| JP | 2009-187683 A | | 8/2009 |

(Continued)

*Primary Examiner* — Devang R Patel
(74) *Attorney, Agent, or Firm* — Sughrue Mion, PLLC (57) ABSTRACT

A terminal connecting method includes setting a conductor having a plurality of strands on an upper surface of a bottom portion of an electric wire crimping part of a terminal, caulking the conductor in a manner to cover the conductor, thereby crimping the conductor by a caulking portion extended from the bottom portion, and welding the plurality of strands together in a strands exposed portion of the conductor exposed from tip end edges of the caulking portion by friction between the plurality of strands and a friction tool, after caulking and crimping.

5 Claims, 6 Drawing Sheets

(56) References Cited

U.S. PATENT DOCUMENTS

| | | | | |
|---|---|---|---|---|
| 8,167,666 | B2* | 5/2012 | Koga | H01R 43/048 |
| | | | | 439/852 |
| 8,826,533 | B2* | 9/2014 | Seifert | H01R 4/187 |
| | | | | 29/857 |
| 9,240,635 | B2* | 1/2016 | Kawamura | H01R 4/20 |
| 9,289,848 | B2* | 3/2016 | Handel | H01R 43/28 |
| 9,520,668 | B2* | 12/2016 | Schmidt | H01R 13/422 |
| 2004/0029454 | A1* | 2/2004 | Onuma | H01R 11/28 |
| | | | | 439/747 |
| 2008/0254666 | A1* | 10/2008 | Cret | H01R 43/20 |
| | | | | 439/312 |
| 2011/0094797 | A1 | 4/2011 | Otsuka et al. | |
| 2013/0112476 | A1 | 5/2013 | Yabe | |
| 2016/0006138 | A1 | 1/2016 | Harms et al. | |
| 2017/0018859 | A1* | 1/2017 | Drew | H01R 43/28 |

FOREIGN PATENT DOCUMENTS

| | | | |
|---|---|---|---|
| JP | 2009187683 A * | 8/2009 | |
| JP | 2011-82127 A | 4/2011 | |
| JP | 2012-28112 A | 2/2012 | |
| JP | 2017-126520 A | 7/2017 | |

* cited by examiner

TERMINAL CONNECTING METHOD

CROSS REFERENCE TO RELATED APPLICATIONS

This application claims priority from Japanese Patent Application No. 2017-226072 filed on Nov. 24, 2017, the entire contents of which are incorporated herein by reference.

BACKGROUND OF THE INVENTION

Field of the Invention

The invention relates to a terminal connecting method.

Description of Related Art

In a conventional terminal connecting structure for connecting a terminal to an electric wire, generally, a pair of caulking portions formed in an electric wire crimping part of the terminal are caulked to a conductor exposed to the end portion of an electric wire with an insulating coating peeled off therefrom, whereby the terminal is connected to the electric wire.

Incidentally, recently, there is a movement in which, as an electric wire used in an automotive wire harness, an aluminum electric wire is used instead of a copper electric wire from lightness and good recyclability. However, when the aluminum electric wire is used as the electric wire of the automotive wire harness, an oxide film strong and having large electrical resistance exists on the surface of an aluminum- or aluminum alloy-made conductor, which lowers the electrical contact performance in connecting a terminal thereto.

Thus, in solving the above problem, for example, the patent document 1 discloses a method for manufacturing an electric wire with terminal fittings, in which a core of an electric wire is sandwiched by a jig and ultrasonic vibrations are applied to the core to form roughened regions on surfaces of a plurality of strands, and, after then, a crimping part of the terminal is crimped to the roughened regions. Consequently, the roughened regions formed on the surfaces of the strands rub against each other, thereby peeling off films such as oxide films formed on the surfaces of the strands. Thus, the strands with their newly generated surfaces exposed come into contact with each other and thus they are electrically connected to each other, thereby reducing the electrical resistance between the electric wire and terminal.

Also, for example, the patent document 2 discloses a terminal connecting structure in which an electric wire crimping part includes a friction stir welding portion formed by causing a conductor and a bottom portion and a caulking portion of a terminal to flow plastically integrally. According to this terminal connecting structure, the conductor and electric wire crimping part are fixed together by a crimping force and a connecting force due to the friction stir welding. That is, since the conductor is strongly fixed between the caulking and bottom portions and is thereby prevented from generating a clearance with them, the electrical contact resistance can be lowered and the fixing force can be increased.

[Patent Document 1] JP-A-2011-82127
[Patent Document 2] JP-A-2012-28112

According to a related art, in a method for manufacturing an electric wire with terminal fittings, ultrasonic equipment for applying ultrasonic vibrations to a core of the electric wire is often expensive, thereby increasing a manufacturing cost.

According to a related art, in a terminal connecting structure, a pin portion of a rotating connecting tool is bitten into an electric wire crimping part, and the electric wire crimping part and conductor in a bitten portion are caused to flow plastically. Therefore, a pin biting portion can apply stress to a caulking portion in an opening direction, or can break the core of the conductor. This can lower fixing force of the electric wire crimping part to the conductor.

SUMMARY

One or more embodiments provide an inexpensive terminal connecting method which, without lowering fixing force of an electric wire crimping part, can reduce the electrical contact resistance.

In an aspect (1), a terminal connecting method includes setting a conductor having a plurality of strands on an upper surface of a bottom portion of an electric wire crimping part of a terminal, caulking the conductor in a manner to cover the conductor, and thereby crimping the conductor by a caulking portion extended from the bottom portion, and welding the plurality of strands together in a strands exposed portion of the conductor exposed from tip end edges of the caulking portion by friction between the plurality of strands and a friction tool, after caulking and crimping.

According to the aspect (1), since films such as oxide films formed on the surfaces of the adhered strands are broken to provide an adhered portion where the strands are bonded to each other, the electrical connection reliability is improved. Also, since only the strands exposed portion of the conductor is adhered but the caulking portion is not adhered, the fixing force of the electric wire crimping part to the conductor cannot be lowered. Thus, the conductor is mechanically connected by the caulking portion and the conductor is electrically connected by the adhered portion, so that the conductor can be connected to the terminal stably. That is, since, when welding together the strands, an adverse effect on the caulking portion can be reduced, the electrical contact resistance can be reduced without lowering the fixing force of the electric wire crimping part to the conductor.

Also, since the plurality of strands in the strands exposed portion of the conductor can be rubbed and adhered together using, for example, a friction tool having a simple configuration capable of rotation or reciprocation, the manufacturing cost can be reduced without requiring expensive ultrasonic equipment.

Also, the connecting portion in the caulking portion and adhered portion can be visually observed, thereby facilitating the judgement of the quality of the connected state between the terminal and conductor.

In an aspect (2), the plurality of strands in the strands exposed portion and the tip end edges of the caulking portion are adhered together by the friction between the plurality of strands and the tip end edges, and the friction tool.

According to the aspect (2), when welding the strands exposed portion of the conductor, the front end edge of the caulking portion is also adhered to the strands, so that the caulking portion can enhance the electrical connection reliability with the conductor.

In an aspect (3), the plurality of strands are pressed from a tip end side of the strands exposed portion, and adhered together by the friction between the plurality of strands and the friction tool.

According to the aspect (3), since the friction tool, while pressing, rubs strokingly the tip ends of the plurality of strands to adhere the strands exposed portion, there is less possibility that the friction tool can dig up the strands or cut the strands into pieces.

In an aspect (4), the conductor is a bundle of the plurality of strands exposed in one end portions of a plurality of electric wires in which insulating coatings are peeled off respectively.

According to the aspect (4), since the strands in the bundles of strands respectively exposed to the end portions of the plurality of electric wires are adhered together, the plurality of electric wires can be connected to the terminal stably and easily.

In an aspect (5), the plurality of strands are made of aluminum or aluminum alloy.

According to the aspect (5), this method is particularly effective when an aluminum electric wire and a terminal are crimped to each other. That is, in the case of the aluminum electric wire, a strong oxide film exists on the surface of a strands made of aluminum or aluminum alloy, which is an inhibitory factor in reducing the electrical resistance. However, since the oxide films formed on the surfaces of the plurality of adhered strands are broken, the terminal and aluminum electric wire can be connected together with small electrical connection resistance.

According to one or more embodiments, there can be provided an inexpensive terminal connecting method which can reduce the electrical contact resistance without lowering the fixing force of a conductor crimping part.

The invention has been described briefly hereinabove. Further, when the below-described mode for carrying out the invention (which is hereinafter called "embodiments") is read through with reference to the accompanying drawings, the details of the invention will be further clarified.

DETAILED DESCRIPTION

Description is given hereinbelow of embodiments according to the invention with reference to the drawings.

First Embodiment

Figures 1A, 1B:
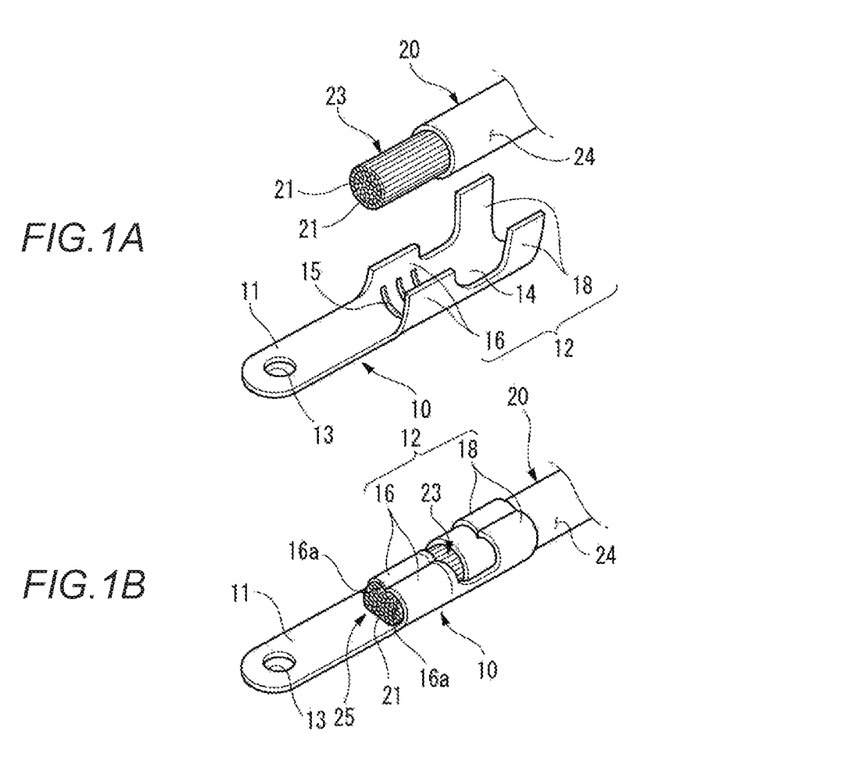
FIGS. 1A to 1C are perspective views for explaining the steps of a terminal connecting method according to a first embodiment.
Figure 1C:
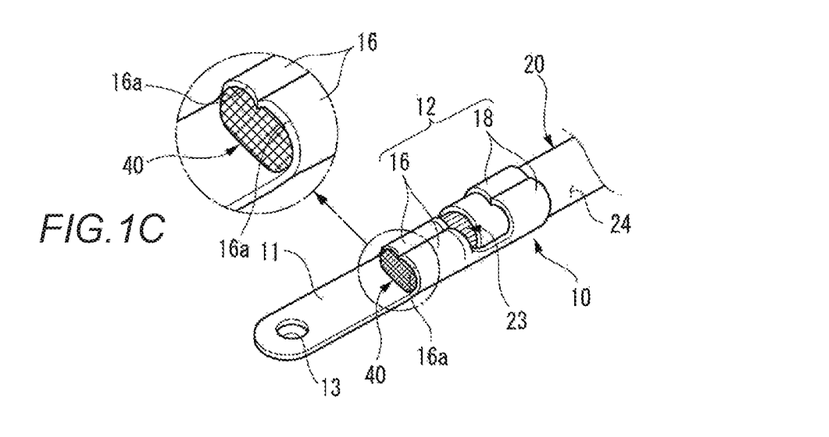
Figure 2A:
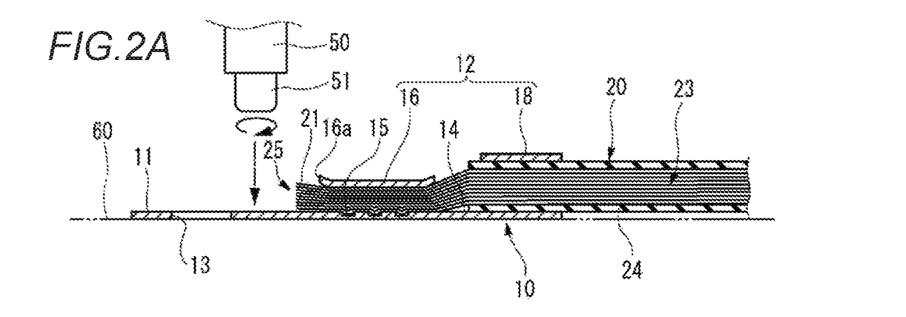
FIGS. 2A to 2C are section views for explaining the terminal connecting method shown in FIGS. 1A to 1C.
Figure 2B:
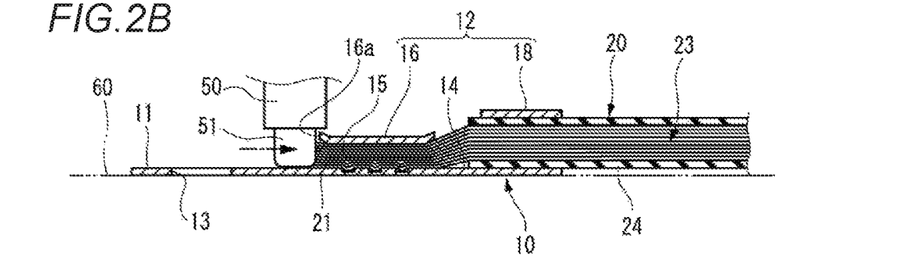
Figure 2C:
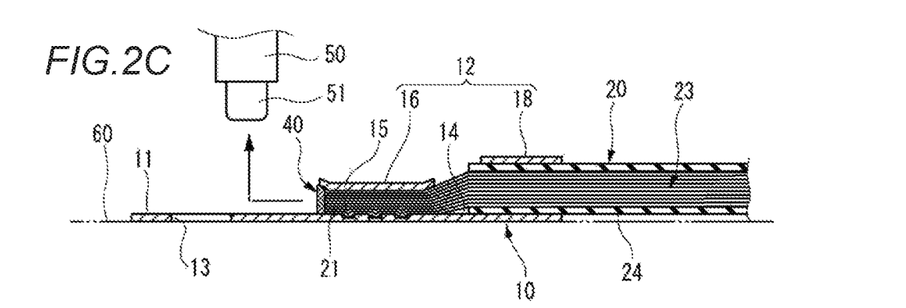

FIGS. 1A to 1C are perspective views for explaining the steps of a terminal connecting method according to a first embodiment of the invention, FIGS. 2A to 2C are section views for explaining the terminal connecting method shown in FIGS. 1A to 1C, and FIGS. 3A and 3B are plan views for explaining a terminal connecting method for connecting a terminal 10 shown in FIGS. 2A to 2C.

As shown in FIGS. 1A to 3B, the terminal connecting method according to the first embodiment of the invention is a terminal connecting method for connecting the terminal 10 to an electric wire 20. Here, in this specification, the terminal 10 and electric wire 20 connecting method is described assuming that the terminal side is defined as "front" and the electric wire side as "rear".

The electric wire 20, as shown in FIG. 1A, is an aluminum electric wire whose conductor 23 is made of aluminum or aluminum alloy. The conductor 23 is formed by bundling a plurality of strands 21. An insulating coating 24 is made of an electrically insulating synthetic resin and is formed to surround the outer periphery of the conductor 23 to thereby protect the conductor 23 from being insulatable from the outside. In the end portion of the electric wire 20, the insulating coating 24 is peeled off, whereby the end portion of the conductor 23 is exposed. A conductor caulking portion (caulking portion) of the terminal 10 is connected to the exposed conductor 23. Here, in the terminal connecting method according to the present embodiment, the electric wire is not limited to the aluminum electric wire but various kinds of electric wires such as a copper electric wire made of copper, or copper alloy can also be used.

The terminal 10 is a terminal which, as shown in FIG. 1A, is formed by molding a plate-shaped member made of metal such as copper or copper alloy by mold press working or the like. The terminal 10 includes a partner connecting part 11 and an electric wire crimping part 12 formed integrally with the partner connecting part 11.

The electric wire crimping part 12 includes a bottom portion 14, a conductor caulking portion 16 extended from the two side edges of the bottom portion 14, and a coating caulking portion 18 respectively continuing to the rear of associated conductor caulking portion 16. Here, the terminal connecting method according to the present embodiment may also be used to connect a terminal 10, whose electric crimping part 12 excludes the coating caulking portion 18 but includes only the conductor caulking portion 16, to the electric wire 20.

Also, in the inner surfaces of the conductor caulking portion 16 and the upper surface of the bottom portion 14 corresponding to the conductor caulking portion 16 inner surfaces, there are formed serrations (recessed portions) 15. In the first embodiment, three serrations 15 are formed side by side at intervals in the extending direction (the left-and-right direction in FIGS. 2A to 2C) of the electric wire 20.

The partner connecting part 11 is formed in a substantially rectangular shape having a mounting hole 13 through which, for example, a bolt can be inserted, and is connected to a partner terminal (not shown) by bolts and nuts. Here, the shape of the partner connecting part 11 is not limited to the configuration of the present embodiment but can be other shapes such as a circular shape.

Next, description is given of a terminal connecting method according to the first embodiment.

The terminal connecting method according to the first embodiment includes a conductor crimping step and a welding step.

(Conductor Crimping Step)

Firstly, in the conductor crimping step, as shown in FIGS. 1A and 1B, the conductor 23 having a plurality of strands 21 is set on the upper surface of the bottom portion 14 of the electric wire crimping part 12 of the terminal 10, and the conductor caulking portion 16, which is a caulking portion extended from the bottom portion 14, caulk the conductor 23 in a manner to cover the same, thereby crimping the conductor 23.

In the first embodiment, the conductor 23 exposed to the end portion of the electric wire 20 is placed on the upper surface of the bottom portion 14 with the serrations 15 formed therein, and the front end of the insulating coating 24 is placed on the upper surface of the bottom portion 14 corresponding to the coating caulking portion 18. And, the conductor caulking portion 16 is caulked in a manner to cover the conductor 23 and are thereby crimped to the conductor 23; and also, the coating caulking portion 18 is caulked in a manner to cover the front end of the insulating coating 24 and are thereby crimped to the insulating coating 24.

The serrations 15 formed in the conductor caulking portion 16, when the conductor caulking portion 16 is caulked, bite into the conductor 23 to thereby break oxide films formed on the surfaces of the strands 21 of the electric wire 20 having a relatively small diameter, so that the electrical contact resistance can be lowered.

(Welding Step)

Next, in the welding step, as shown in FIG. 1C, using a friction tool 51, the plurality of strands 21 in the strands exposed portion 25 of the conductor 23 exposed from the front end edges 16a of the conductor caulking portion 16 is adhered to each other, thereby forming an adhered portion 40.

The friction tool 51 according to the first embodiment, as shown in FIGS. 2A and 2B, is formed in a cylindrical shape whose tip end portion is rounded and whose tip end face has a small surface roughness and, when driven rotationally by a motor 50 with its axis as the rotation center thereof, rubs against the tip end of the strands exposed portion. The axial length dimension of the friction tool 51 is set larger than the height from the upper surface of the bottom portion 14 to the upper end of the strands exposed portion 25. Also, the diameter of the friction tool 51 is set properly depending on the shape, size and the like of the strands exposed portion 25 to be adhered.

Here, the configuration of the friction tool according to the present embodiment is not limited to that of the friction tool 51 that is rotationally driven, but various configurations may be employed. For example, there may be used, for example, a plate-shaped friction tool configured such that it can reciprocate in a terminal width direction or in a terminal plate thickness direction to rub against the tip end of the strands exposed portion 25.

Also, referring to the friction tool 51, for example, by mounting it on a motor 50 capable of moving in the X-, Y- and Z-axis directions (in the fore-and-rear, left-and-right and up-and-down directions), or by using it together with a vertically movable motor 50 and a horizontally movable work table, or by mounting it on a motor 50 fixed to the tip end of a multi-axis robot arm, the friction tool 51 is preferably capable of moving relatively to the strands exposed portion 25 of the conductor 23 crimped to the terminal 10 in the X-, Y- and Z-axis directions.

In a specific welding procedure, firstly, as shown in FIG. 2A, the terminal 10 crimped to the end portion of the electric wire 20 is fixed onto a work table 60. And, the friction tool 51 mounted on the motor 50 capable of moving in the X-, Y- and Z-axis directions is lowered just before the tip end (the lower end in FIG. 2A) thereof comes into contact with the bottom portion 14. In this case, the tip end of the friction tool 51 may come into contact with the bottom portion 14 to the extent that no adverse effect occurs.

The friction tool 51 may be rotationally driven by the motor 50 after it lowers, or may be started to rotate while it is lowering.

Figure 3A:
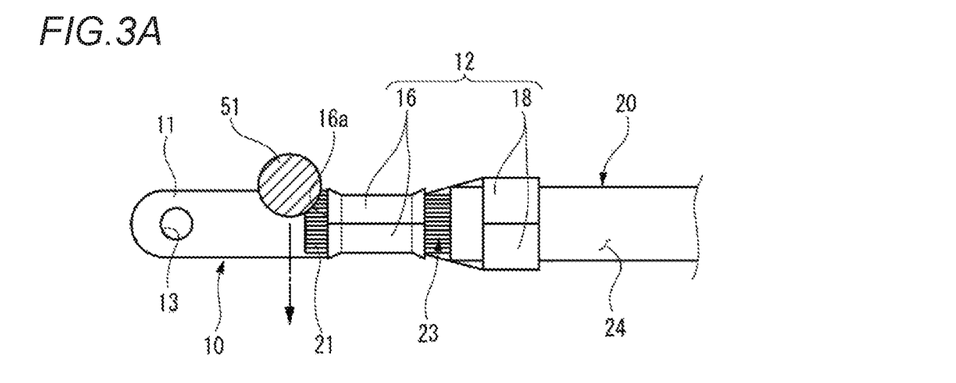
FIGS. 3A and 3B are plan views for explaining a terminal connecting method for connecting a terminal shown in FIGS. 2A to 2C.
Figure 3B:
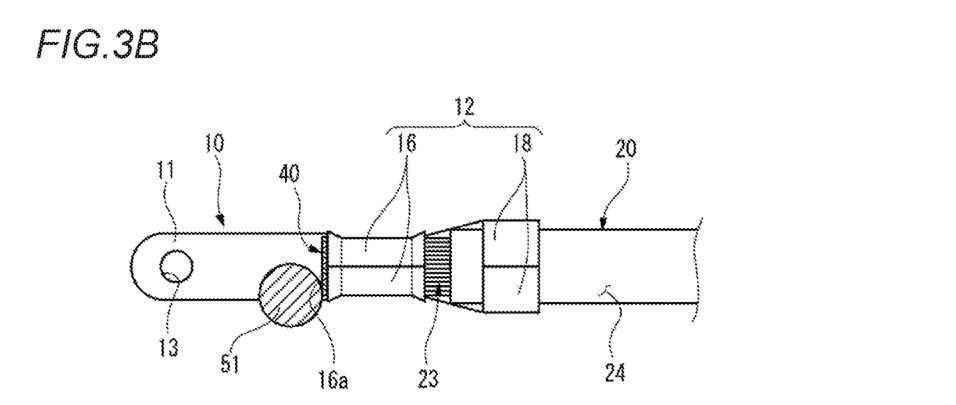

And, as shown in FIG. 2B, the rotating friction tool 51, while pressing, strokingly rubs the plurality of strands 21 from the tip end side of the strands exposed portion 25 to thereby cause them to adhere to each other. In this case, the friction tool 51, as shown in FIGS. 3A and 3B, presses and rubs the plurality of strands 21 while moving in the terminal width direction (the vertical direction in FIGS. 3A and 3B) along the tip end of the strands exposed portion 25. The strands 21 in the strands exposed portion 25 are softened due to the friction heat of the friction tool 51 and are thereby allowed to flow plastically; and, the thus plastically fluidized strands 21, after retraction of the friction tool 51, are rapidly cooled and solidified by heat conduction, thereby forming an adhered portion 40 shown in FIG. 2C (a shaded portion in FIG. 2C). The adhered portion 40 is formed because the plurality of strands 21 plastically flow integrally and adhere to each other.

Here, the movement of the friction tool 51 in the terminal width direction may be the forward movement that the friction tool 51 relatively moves in one direction of the terminal width direction along the tip end of the strands exposed portion 25, or may be the reciprocating movement that the friction tool 51 relatively moves in the terminal width direction.

Here, after the adhered portion 40 is formed in the welding step, the periphery of the conductor 23 crimped to the electric wire crimping part 12 is preferably sealed with a sealant. To cover the exposed portion of the conductor 23 with the sealant can prevent water from flowing into the exposed portion from the outside of the crimped terminal 10 and coming into contact with the exposed portion. This can suppress occurrence of galvanic corrosion in the conductor 23 made of aluminum or aluminum alloy crimped to the terminal 10 made of copper or copper alloy.

Next, description is given of the operation of the terminal connecting method according to the first embodiment.

According to the terminal connecting method according to the first embodiment, since the adhered strands 21 provide the adhered portion 40 formed such that films such as oxide films formed on the surfaces of the strands 21 are broken and thus the strands are bonded to each other, the electrical connection reliability is enhanced. Also, since only the strands exposed portion 25 of the conductor 23 is adhered but the conductor caulking portion 16 is not adhered, there is no possibility of a decrease in the fixing force of the conductor caulking portion 16 (the electric wire crimping part 12) to the conductor 23. Thus, when the conductor 23 is mechanically connected by the conductor caulking portion 16 and the conductor 23 is electrically connected by the adhered portion 40, the conductor 23 can be connected to the terminal 10 stably. That is, since, when the strands 21 are adhered to each other, an adverse effect on the conductor caulking portion 16 can be reduced, the electrical contact resistance can be lowered without reducing the fixing force of the conductor caulking portion 16 to the conductor 23.

Also, since the plurality of strands 21 in the strands exposed portion 25 of the conductor 23 can be rubbed against and adhered to each other by the friction tool 51 having an easy configuration capable of rotation or reciprocation, the manufacturing cost can be reduced without requiring expensive ultrasonic equipment like the conventional one.

Also, in the conductor caulking portion 16 and adhered portion 40, as shown in FIG. 1C, the connected portion can be visually observed, which makes it easy to judge the quality of the connected state of the terminal 10 and conductor 23.

Further, according to the terminal connecting method of the first embodiment, since the rotating friction tool 51 presses and strokingly rubs the tip ends of the plurality of strands 21 to thereby adhere the strands exposed portion 25, there is less possibility that the friction tool 51 can dig up the strands 21 or cut the strands 21 into pieces.

Also, according to the terminal connecting method of the first embodiment, since the electric wire 20 having an aluminum electric wire and terminal 10 are crimped to each other, strong oxide films exist on the surfaces of the strands 21 made of aluminum or aluminum alloy, which raises a possibility that the existence of the oxide films can be an inhibitory factor in reducing the electrical resistance. However, since the oxide films formed on the surfaces of the plurality of strands 21 in the adhered portion 40 are broken, the terminal 10 and electric wire 20 can be connected together with small electrical resistance.

Second Embodiment

Figure 4A:
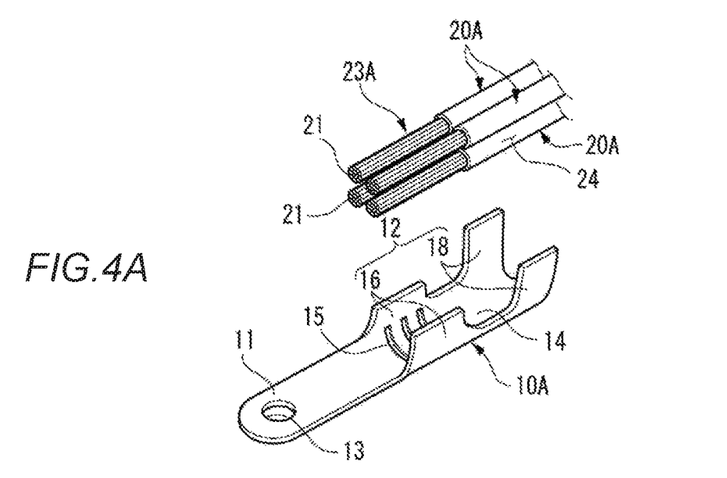
FIGS. 4A to 4C are perspective views for explaining the steps of a terminal connecting method according to a second embodiment.
Figure 4B:
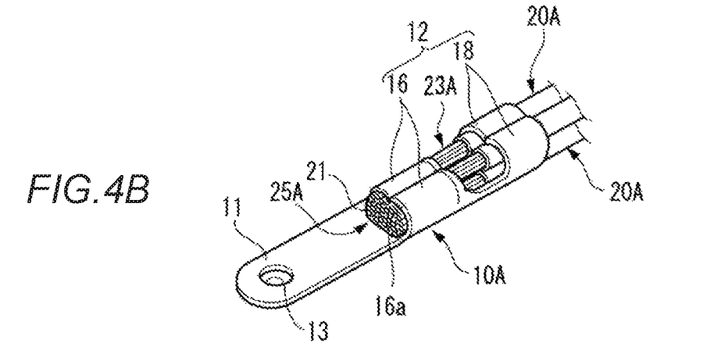
Figure 4C:
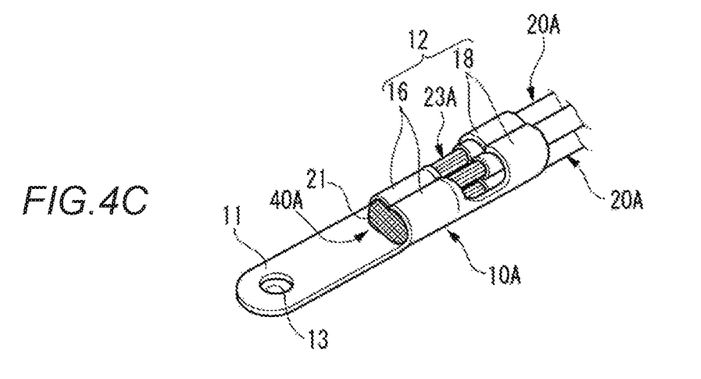

FIGS. 4A to 4C are perspective views for explaining the steps of a terminal connecting method according to a second embodiment of the invention.

As shown in FIGS. 4A to 4C, the terminal connecting method according to a second embodiment of the invention is a terminal connecting method which joint connects plurality of (in the present embodiment, four) electric wires 20A to a terminal 10A. Here, similar configurations to the terminal 10 and electric wires 20 of the first embodiment are given the same designations and the specific description thereof is omitted.

In each of the electric wires 20A, as shown in FIG. 4A, the plurality of strands 21 are bundled together in such a manner that a conductor 23A has a smaller diameter than that of the conductor 23 of the electric wire 20 of the first embodiment. In the end portions of the electric wires 20A, insulating coatings 24 are peeled off to expose the conductors 23A. The conductor caulking portion (caulking portion) 16 of the terminal 10A is connected to the bundles of the strands 21 of the four exposed conductors 23A.

Here, the conductors 23A of the four electric wires 20A may be composed only of aluminum electric wires made of aluminum or aluminum alloy, or may be having copper electric wires made of copper or copper alloy and aluminum electric wires.

The terminal 10A, similarly to the terminal 10 of the first embodiment, is a terminal which is formed by molding a plate-shaped member made of metal such as copper, copper alloy or the like by mold press working or the like, and includes a partner connecting part 11 and an electric wire crimping part 12 formed integrally with the partner connecting part 11.

Next, description is given of a terminal connecting method according to the second embodiment.
(Conductor Crimping Step)

Firstly, in the conductor crimping step, as shown in FIGS. 4A and 4B, bundles of the strands 21 having the four conductors 23A are placed on the upper surface of bottom portion 14 of the electric wire crimping part 12, and the caulking portion 16 extended from the bottom portion 14 caulk the bundles of the strands 21 having the four conductors 23A in a manner to cover the bundles, thereby crimping the conductors 23A In the second embodiment, the bundles of the strands 21 having the four conductors 23A exposed to the end portions of the respective electric wires 20A are placed on the upper surface of the bottom portion 14 in which serrations 15 are formed, and the front ends of the insulating coatings 24 are placed on the upper surface of the bottom portion 14 corresponding to the coating caulking portion 18. And, the conductor caulking portion 16 is caulked in a manner to cover the bundles of the strands 21 having the four conductors 23A and are crimped to the conductors 23A, and the coating caulking portion 18 is caulked in a manner to cover the front ends of the insulating coatings 24 and are crimped to the insulating coatings 24.

The serrations 15 formed in the conductor caulking portion 16, when the conductor caulking portion 16 of the terminal 10A is caulked, are caused to bite into the conductors 23A to thereby break oxide films formed on the surfaces of the strands 21 of the joint connected four electric wires 20A, so that the electrical contact resistance can be lowered.
(Welding Step)

Next, in the welding step, similarly to the terminal 10 according to the first embodiment, using the friction tool 51, as shown in FIG. 4C, the plurality of strands 21 in the strands exposed portion 25A of the bundles of the strands 21 having the four conductors 23A exposed from the front end edges 16a of the conductor caulking portion 16 is adhered to each other to form an adhered portion 40A (a shaded portion in FIG. 4C).

Next, description is given of the operation of the terminal connecting method according to the second embodiment.

According to the terminal connecting method of the second embodiment, in addition to the similar operation effects to the above-mentioned terminal connecting method of the first embodiment, there is provided the following effect. That is, by welding together the strands 21 in the bundles of the strands 21 respectively exposed to the end portions of the plurality of electric wires 20A, the plurality of electric wires 20A can be connected to the terminal 10A stably and easily.

Third Embodiment

Figure 5A:
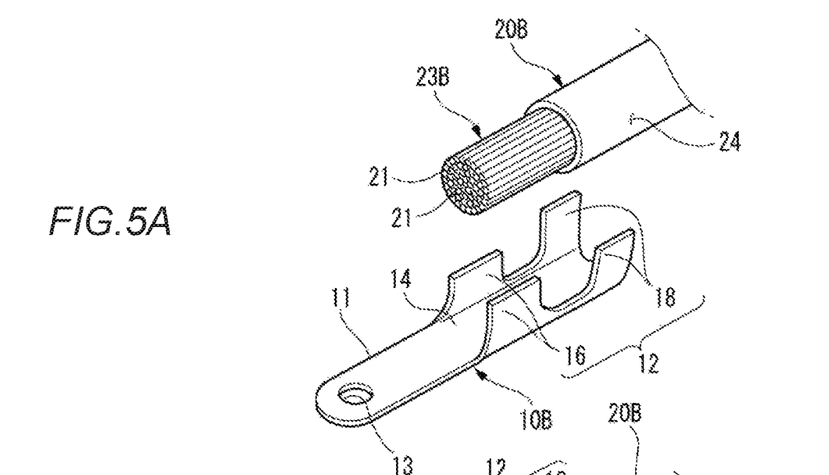
FIGS. 5A to 5C are perspective views for explaining the steps of a terminal connecting method according to a third embodiment.
Figure 5B:
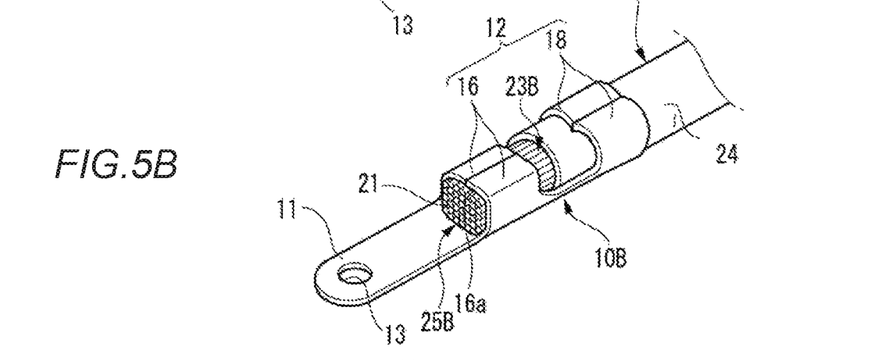
Figure 5C:
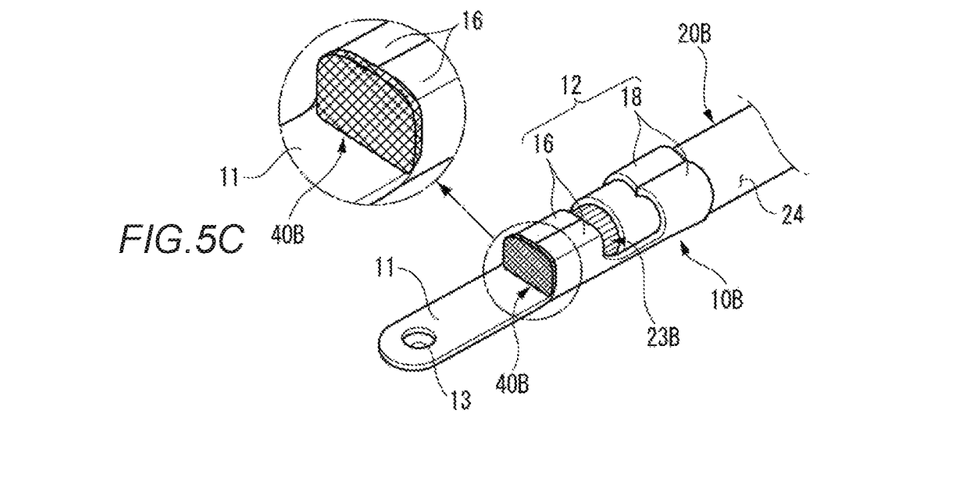
Figure 6A:
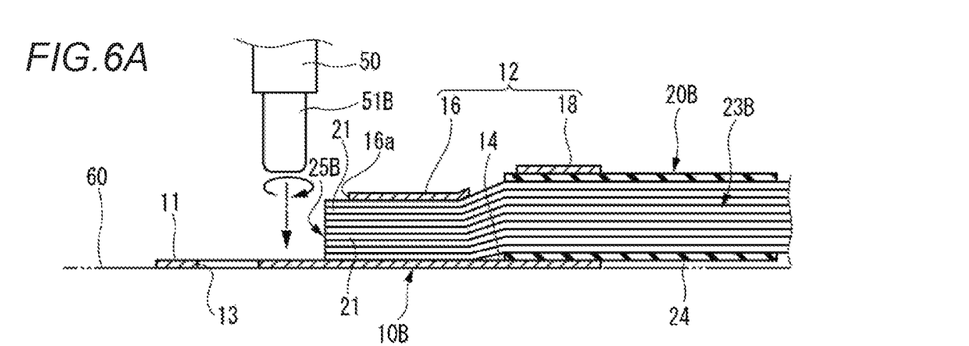
FIGS. 6A to 6C are section views for explaining the terminal connecting method shown in FIGS. 5A to 5C.
Figure 6B:
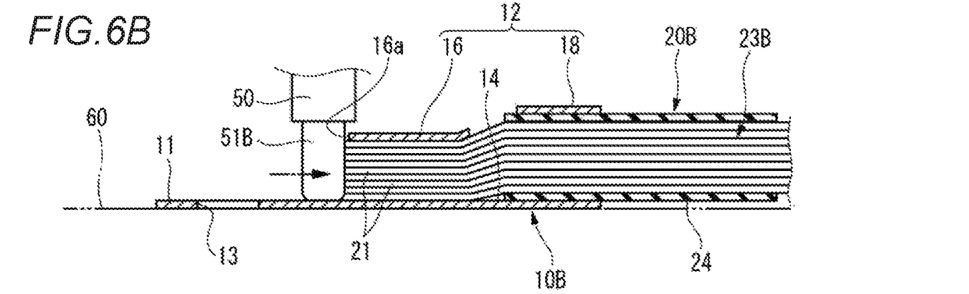
Figure 6C:
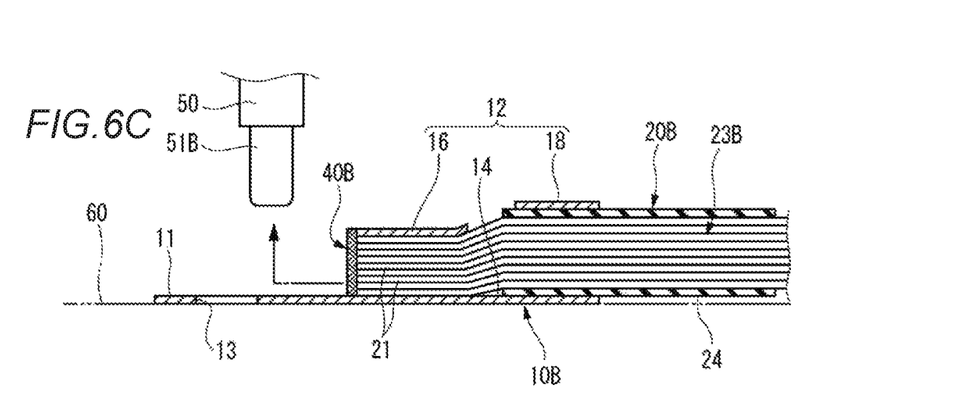

FIGS. 5A to 5C are perspective views for explaining the steps of a terminal connecting method according to a third embodiment of the invention, and FIGS. 6A to 6C are section views for explaining the terminal connecting method shown in FIGS. 5A to 5C.

As shown in FIGS. 5A to 5C, the terminal connecting method according to the third embodiment of the invention is a terminal connecting method which connects thick electric wires 20B, each having a larger diameter than that of the electric wire 20 according to the first embodiment, to a terminal 10B. Here, similar configurations to the terminal 10 and electric wires 20 according to the first embodiment are given the same designations and the specific description thereof is omitted.

The conductor 23B of the electric wire 20B, as shown in FIG. 5A, is made of aluminum or aluminum alloy. The conductor 23B is formed by bundling plurality of strands 21. In the end portion of the electric wire 20B, an insulating coating 24 is peeled off therefrom to expose the conductor 23B. The conductor caulking portion (caulking portion) 16 of the terminal 10B is connected to the exposed conductor 23B.

The terminal 10B, similarly to the terminal 10 of the first embodiment, is a terminal which is formed by molding a plate-shaped member made of metal such as copper, copper alloy or the like by mold press working or the like, and includes a partner connecting part 11 and an electric wire crimping part 12 formed integrally with the partner connecting part 11.

Here, in the terminal 10B, in the inner surfaces of the conductor caulking portion 16 and the upper surface of a bottom portion 14 corresponding to the conductor caulking portion 16 inner surfaces, the serrations 15 formed in the terminal 10 of the first embodiment are not formed. The reason for this is that the conductor 23B is thicker than the conductor 23 and thus the breaking effect by the serrations 15 is hard to be found on the oxide films formed on the surfaces of the strands 21 in the central portion of the conductor 23B. Of course, serrations 15 may be formed on the upper surface of the bottom portion 14 of the terminal 10B.

Next, description is given of a terminal connecting method according to the third embodiment.

(Conductor Crimping Step)

Firstly, in the connector crimping step, as shown in FIGS. 5A and 5B, a conductor 23B having plurality of strands 21 is placed on the upper surface of the bottom portion 14 of the electric wire crimping part 12 of the terminal 10B, and the conductor caulking portion 16 (which constitutes a caulking portion) extended from the bottom portion 14 caulk the conductors 23B in a manner to cover the conductors 23B, thereby crimping the conductors 23B.

In the third embodiment, the conductor 23B exposed to the end portion of the electric wire 20B is placed on the upper surface of the bottom portion 14 corresponding to the conductor caulking portion 16, and the front end of the insulating coating 24 is placed on the upper surface of the bottom portion 14 corresponding to the coating caulking portion 18. And, the conductor caulking portion 16 is caulked in a manner to cover the conductor 23B and are crimped to the conductor 23B, and the coating caulking portion 18 is caulked in a manner to cover the front end of the insulating coating 24 and are crimped to the insulating coating 24.

(Welding Step)

Next, in the welding step, as shown in FIG. 5C, using a friction tool 51B, plurality of strands 21 in the strands exposed portion 25B of the conductor 23B exposed from the front end edges 16a of the conductor caulking portion 16 and the front end edges 16a of the conductor caulking portion 16 are adhered together, thereby forming an adhered portion 40B.

The axial length dimension of the friction tool 51B according to the third embodiment is set larger than the height from the upper surface of the bottom portion 14 to the upper ends of the conductor caulking portion 16 with the conductor 23B crimped thereto.

In a specific welding procedure, firstly, as shown in FIG. 6A, the terminal 10B crimped to the end portion of the electric wire 20B is fixed onto a work table 60. And, the friction tool 51B is lowered just before the tip end thereof (the lower end in FIG. 6A) comes into contact with the bottom portion 14.

The friction tool 51B may be rotationally driven by a motor 50 after it lowers, or may be started to rotate while it is being lowered.

And, as shown in FIG. 6B, the rotating friction tool 51B, from the tip end side of the strands exposed portion 25B, presses and strokingly rubs the plurality of strands 21 and the front end edges 16a of the conductor caulking portion 16 to thereby adhere them together. In this case, the friction tool 51B, similarly to the friction tool 51 of the first embodiment, while moving in the terminal width direction along the tip end of the strands exposed portion 25B, presses and rubs both of the plurality of strands 21 and the front end edges 16a of the conductor caulking portion 16. The plurality of strands 21 in the strands exposed portion 25B and the front end edges 16a of the conductor caulking portion 16 are softened due to the friction heat of the friction tool 51B and are thus allowed to flow plastically. The thus plastically-fluidized strands 21 and front end edges 16a of the conductor caulking portion 16, after the friction tool 51B is retracted, are rapidly cooled and solidified due to heat conduction, thereby forming an adhered portion 40B shown in FIG. 6C (a shaded portion in FIG. 6C). The adhered portion 40B is formed because the strands 21 and front end edges 16a of the conductor caulking portion 16 are allowed to plastically flow integrally and thus the strands 21 and a part (the front end edge 16a) of the conductor caulking portions 16 are adhered to each other.

Next, description is given of the operation of the terminal connecting method according to the third embodiment.

Generally, when connecting the electric wire 20B having a thick electric wire to the terminal 10B, the oxide films formed on the surfaces of the strands 21 in the central portion of the conductor 23B cannot be broken sufficiently only by the caulking forces of the conductor caulking portion 16, so that it is difficult to reduce the electrical contact resistance between the conductor caulking portion 16 of the terminal 10B and the strands 21 of the electric wire 20B.

However, according to the terminal connecting method of the third embodiment, when welding the strands exposed portion 25B of the conductor 23B, the front end edges 16a of the conductor caulking portion 16 are adhered together with the strands 21. And, since films such as oxide films formed on the surfaces of the strands 21 are broken, the strands 21 and the front end edges 16a of the conductor caulking portion 16 are allowed to provide an adhered portion 40B in which they are bonded together. Thus, the conductor caulking portion 16 of the terminal 10B are allowed to enhance the electrical connection reliability with the conductor 23B of the electric wire 20B.

Here, since only the front end edges 16a of the conductor caulking portion 16 in the terminal 10B are adhered to the strands 21 of the conductor 23B, an adverse effect such as stress to be applied to the conductor caulking portion 16 by the friction tool 51B can be minimized, resulting in the low possibility of decreasing the fixing forces of the conductor caulking portion 16 to the conductor 23B.

As described heretofore, according to the terminal connecting methods of the above embodiments, the electrical contact resistance between the terminals 10, 10A, 10B and conductor 23, 23A, 23B can be lowered without reducing the fixing forces of the conductor caulking portion 16.

Now, the characteristics of the embodiments of the terminal connecting method of the invention are briefly summarized and listed below.

[1] A terminal connecting method comprising:

setting a conductor (23, 23A, 23B) having a plurality of strands (21) on an upper surface of a bottom portion (14) of an electric wire crimping part (12) of a terminal (10, 10A, 10B);

caulking the conductor (23, 23A, 23B) in a manner to cover the same, and thereby crimping the conductor (23, 23A, 23B) by a caulking portion (a conductor caulking portion 16) extended from the bottom portion (14); and welding the plurality of strands (21) together in an strands exposed portion (25, 25A, 25B) of the conductor (23, 23A, 23B) exposed from tip end edges (16a) of the caulking portion (conductor caulking portion 16) by friction between the plurality of strands (21) and a friction tool (51, 51B), after caulking and crimping.

[2] A terminal connecting method according to the above configuration [1], wherein the plurality of strands (21) in the strands exposed portion (25B) and the tip end edges (16a) of the caulking portion (conductor caulking portion 16) are adhered together by the friction between the plurality of strands (21) and the tip end edges (16a), and the friction tool (51B).

[3] A terminal connecting method according to the above configuration [1] or [2], wherein the plurality of strands (21) are pressed from a tip end side of the strands exposed portion (25, 25A, 25B), and adhered together by the friction between the plurality of strands (21) and the friction tool (51B).

[4] A terminal connecting method according to anyone of the above configurations [1] to [3], wherein the conductor (23A) is a bundle of the plurality of strands (21) exposed in one end portions of a plurality of electric wires (20A) in which insulating coatings (24) are peeled off respectively.

[5] A terminal connecting method according to anyone of the above configurations [1] to [4], wherein the plurality of strands (21) are made of aluminum or aluminum alloy.

DESCRIPTION OF REFERENCE NUMERALS AND SIGNS

10: Terminal
11: Partner connecting part
12: Electric wire crimping part
14: Bottom portion
16: Conductor caulking portion (Caulking portion)
18: Coating caulking portion
16a: Front end edge
20: Electric wire
21: Strand
23: Conductor
25: Strands exposed portion
51: Friction tool

What is claimed is:

1. A terminal connecting method comprising:
   setting a conductor having a plurality of strands on an upper surface of a bottom portion of an electric wire crimping part of a terminal;
   caulking the conductor in a manner to cover the conductor, thereby crimping the conductor by a caulking portion extended from the bottom portion; and
   welding the plurality of strands together in a strands exposed portion of the conductor exposed from tip end edges of the caulking portion by friction between the plurality of strands and a friction tool, after caulking and crimping, wherein the welding includes first contacting the friction tool with the strands exposed portion,
   wherein the plurality of strands in the strands exposed portion and the tip end edges of the caulking portion are adhered together by the friction between the plurality of strands and the friction tool and friction between the tip end edges and the friction tool,
   wherein a rotational axis of the friction tool is perpendicular to an extending direction of the plurality of strands,
   wherein the plurality of strands are pressed from a tip end side of the strands exposed portion, and adhered together by the friction between the plurality of strands and the friction tool, and
   wherein the plurality of strands are pressed and rubbed by the friction tool while the friction tool moves in a terminal width direction along the tip end side of the strands exposed portion.

2. The terminal connecting method according to claim 1, wherein the conductor comprises a bundle of the plurality of strands exposed from a plurality of electric wires by peeling off insulating coatings therefrom.

3. The terminal connecting method according to claim 1, wherein the plurality of strands are made of aluminum or aluminum alloy.

4. The terminal connecting method according to claim 1, wherein the welding includes contacting the friction tool to an end face of the strands exposed portion.

5. The terminal connecting method according to claim 1, wherein in the welding, a side surface of the friction tool extending along the rotation axis contacts the plurality of strands in the strands exposed portion and the tip end edges of the caulking portion.

* * * * *